Figure 4:
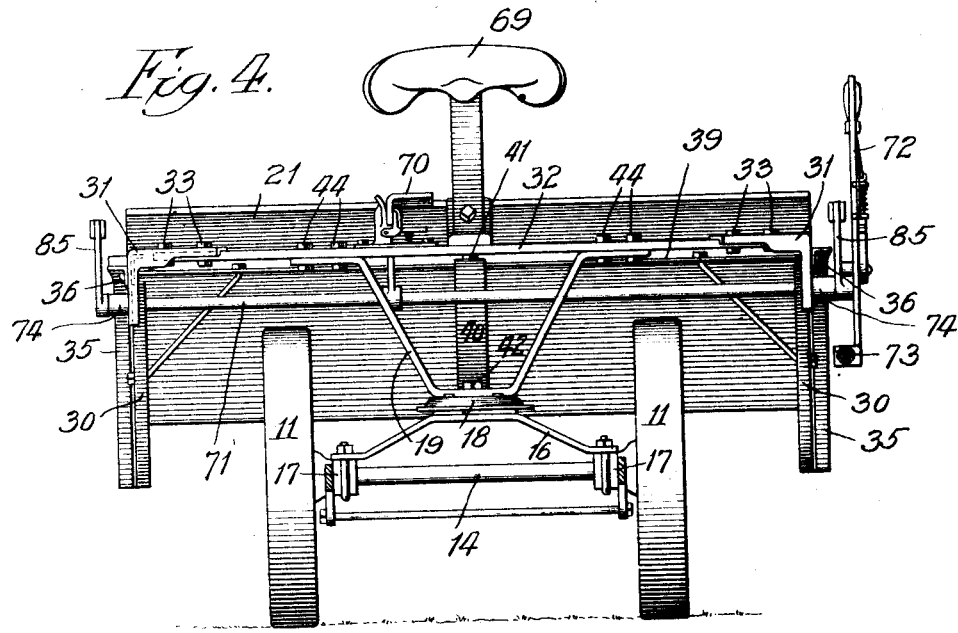

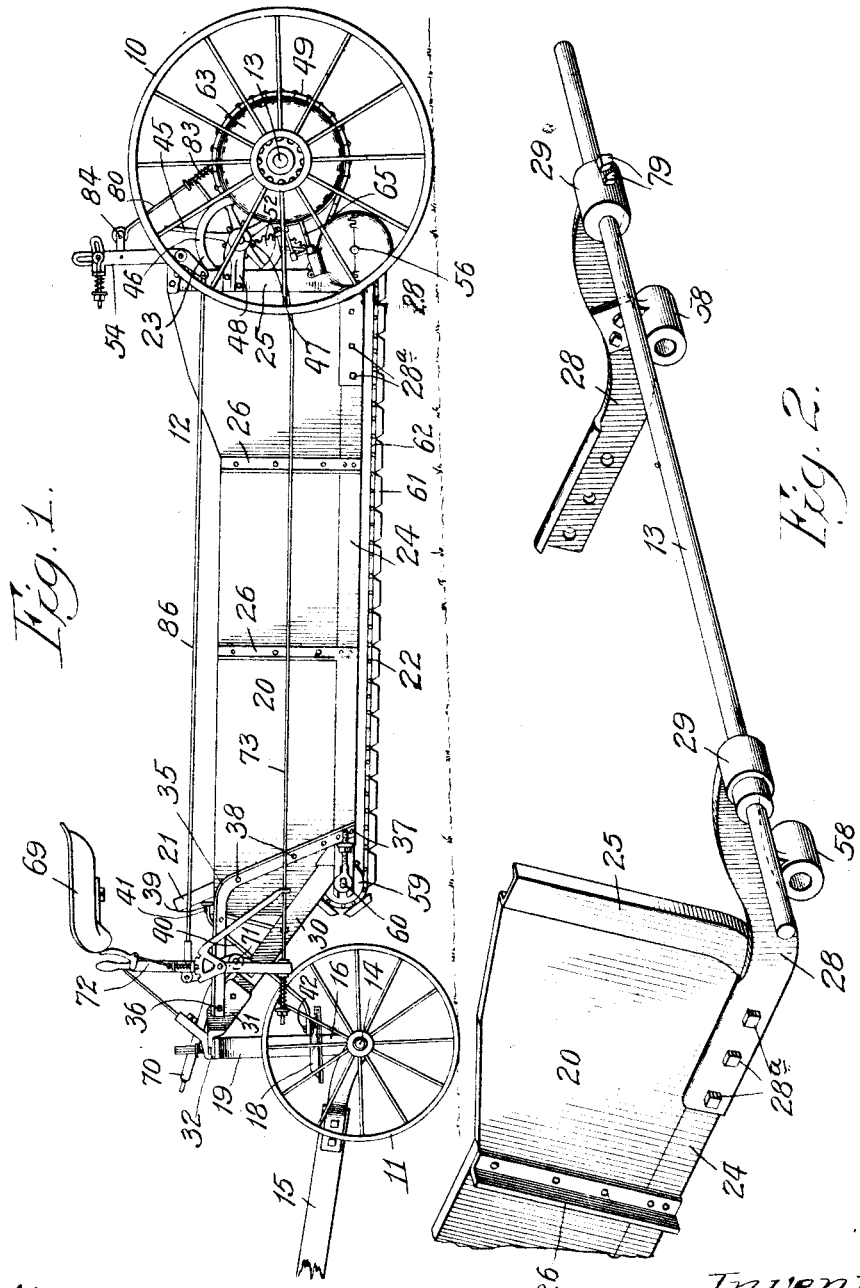

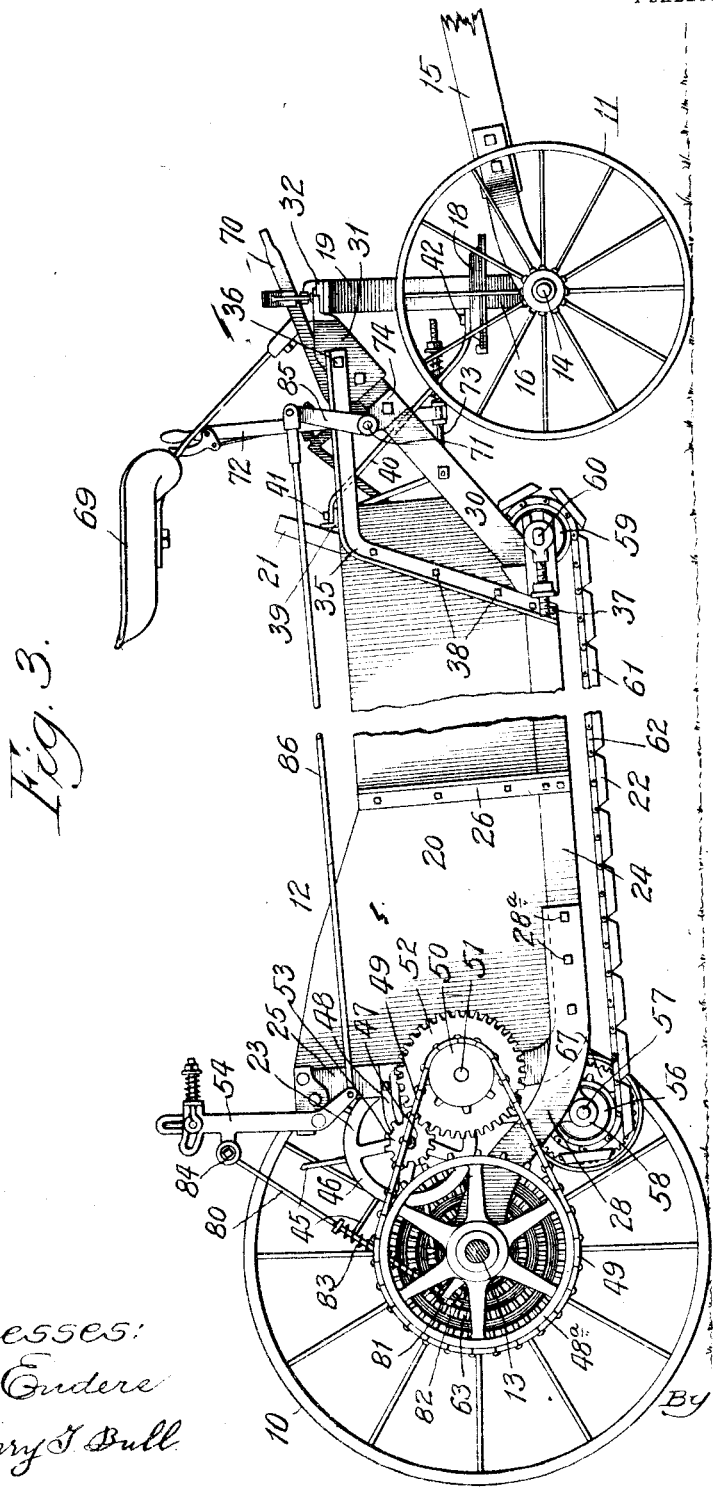

C. R. DAVIS.
FERTILIZER DISTRIBUTER.
APPLICATION FILED OCT. 2, 1911.

1,103,272.

Patented July 14, 1914.
4 SHEETS—SHEET 3.

Witnesses:
John Enders
Henry T Bull

Inventor:
Calvin R. Davis
By Fred Gerlach
Atty

C. R. DAVIS.
FERTILIZER DISTRIBUTER.
APPLICATION FILED OCT. 2, 1911.

1,103,272.

Patented July 14, 1914.
4 SHEETS—SHEET 4.

Witnesses:
John Enders
Henry T Bull

Inventor:
Colvin R. Davis
By Fred Gerlach
Atty.

UNITED STATES PATENT OFFICE.

CALVIN R. DAVIS, OF CHICAGO HEIGHTS, ILLINOIS, ASSIGNOR, BY MESNE ASSIGNMENTS, TO EMERSON-BRANTINGHAM COMPANY, OF ROCKFORD, ILLINOIS, A CORPORATION OF ILLINOIS.

FERTILIZER-DISTRIBUTER.

1,103,272.  Specification of Letters Patent.  Patented July 14, 1914.

Application filed October 2, 1911. Serial No. 652,371.

*To all whom it may concern:*

Be it known that I, CALVIN R. DAVIS, a resident of Chicago Heights, in the county of Cook and State of Illinois, have invented certain new and useful Improvements in Fertilizer-Distributers, of which the following is a full, clear, and exact description.

The invention relates to fertilizer-distributers and more particularly to spreaders of that type generally known as "low down" spreaders, in which the bottom of the box or the receptacle for the fertilizer is disposed close to the ground to facilitate the loading of the box.

In "low down" spreaders, it has heretofore been customary to extend the axle for the rear carrying wheels through the beater and this disposition did not leave the rear portion of the box convenient of access during the loading operation and furthermore, necessitated, in some instances, complicated gearing between the driving axle and the beater. Another disadvantage of placing the beater on the rear axle is, that when removal of the beater is necessary for repairs the carrying-wheels and axle must be removed in order to permit removal of the beater.

The present invention designs primarily to provide an improved "low down" fertilizer-distributer, in which substantially all of the parts of the box or receptacle, including the rear portion adjacent the beater are easily accessible during loading, and this object is attained by disposing the rear axle of the carrying-wheels rearwardly of the box and the beater and by disposing the latter so that it will discharge the fertilizer rearwardly over the axle and on to the ground. As a result of this construction and arrangement, mounting the beater on the rear axle is avoided and a common or simple type of gearing may be employed between the rear axle and the beater, to drive the latter at the desired speed. Furthermore, by disposing the rear end of the receptacle in the front of the rear axle, the box or the receptacle may be securely suspended between the front wheels and rear axle, and as close to the ground as desired, and the disposition of the beater may be independent of the rear axle.

The invention further designs to provide a fertilizer-distributer of improved construction.

The invention consists in the several novel features hereinafter set forth and more particularly defined by claims at the conclusion hereof.

Figure 5:
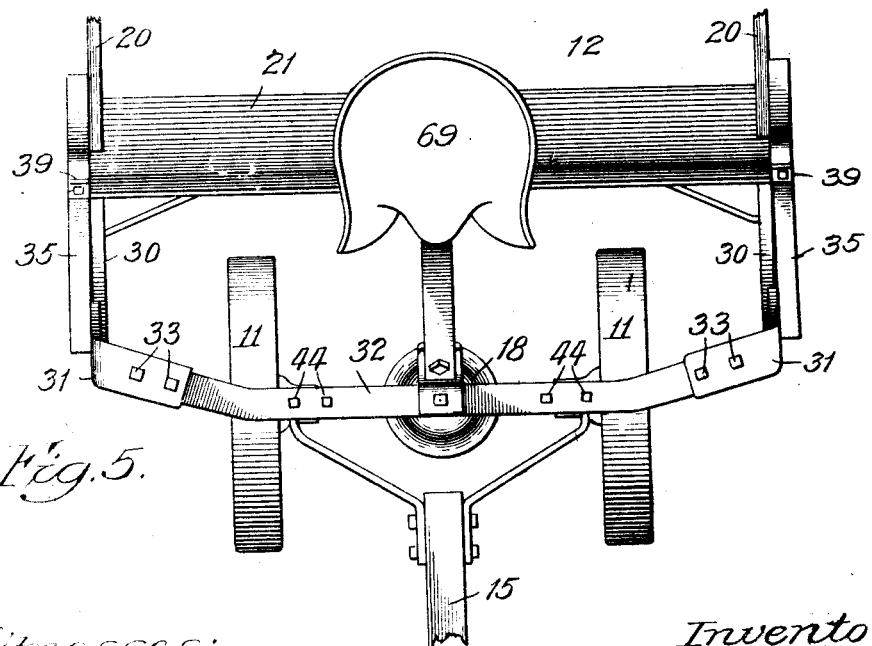
Figure 6:
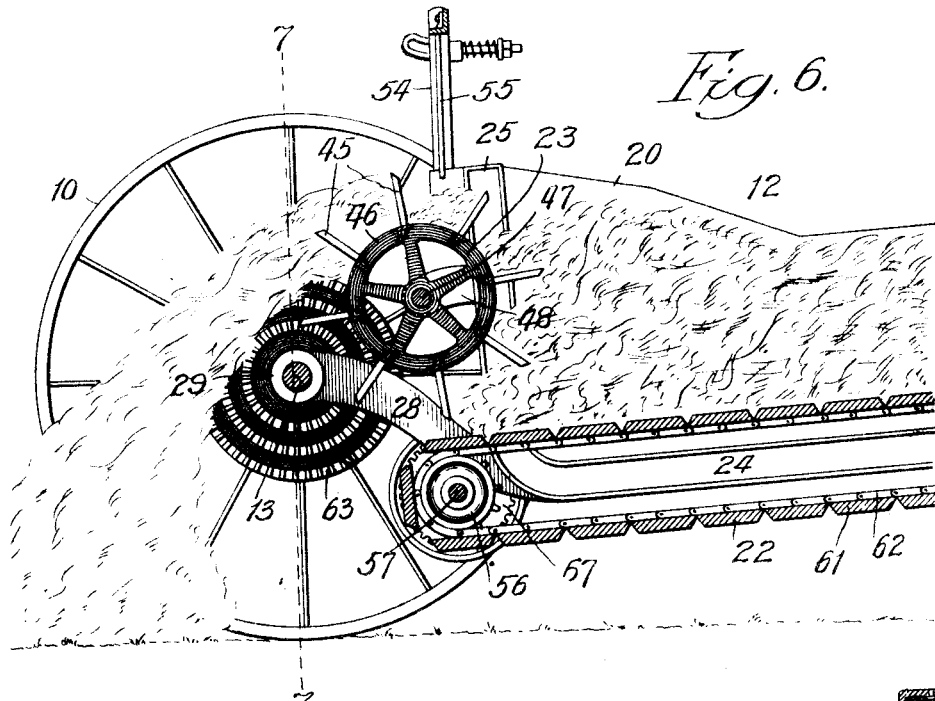
Figure 7:
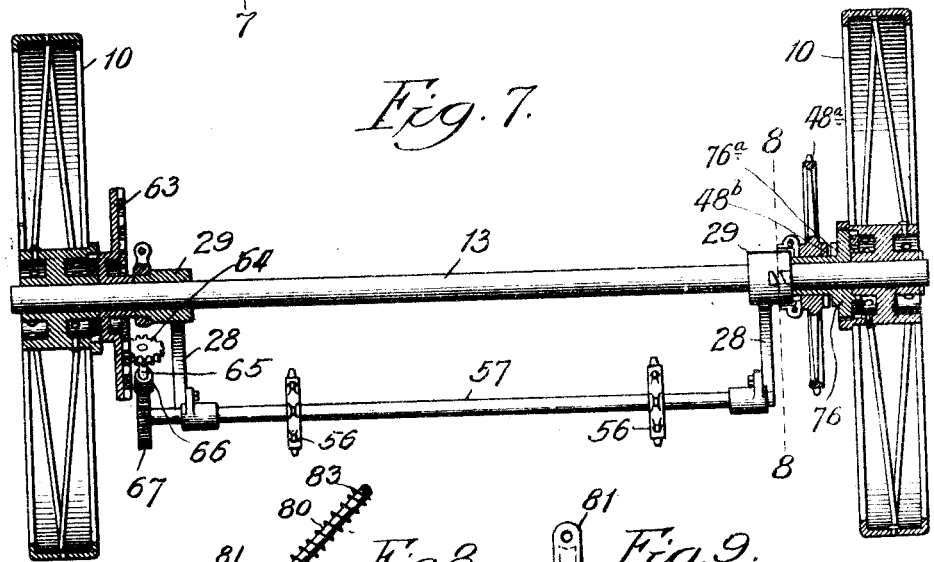
Figure 8:
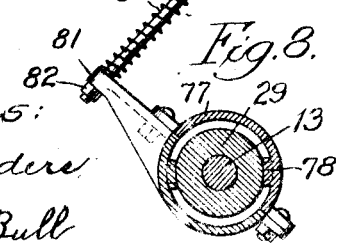
Figure 9:

In the drawings: Figure 1 is a side elevation of a distributer embodying the invention. Fig. 2 is a detail perspective of the rear axle and the supporting brackets therefor. Fig. 3 is a side elevation of the other side of the spreader, the central portion being broken away. Fig. 4 is a front elevation. Fig. 5 is a plan of the front portion of the machine. Fig. 6 is a central longitudinal section of the rear portion of the machine. Fig. 7 is a section taken on line 7—7 of Fig. 6. Fig. 8 is a section on line 8—8 of Fig. 7. Fig. 9 is a detail of a part of the clutch-shifter.

The improved spreader comprises a pair of rear carrying-wheels 10, a pair of front dirigible carrying-wheels 11 and a suitable box or receptacle for the fertilizer, which is suspended between the front and rear wheels, in such manner that the bottom of the receptacle will be disposed in close proximity to the ground and so that the fertilizer may be readily thrown over the sides of the box and on to the bottom thereof. An axle 13 extends through the rear wheels 10 and is sustained thereby. A front axle 14 is mounted in front wheels 11 and a draft-tongue 15 is connected to said axle in any suitable manner. An arched bar 16 is secured to collars 17 on axle 15 and is secured to one member of turn-table 18 which permits the front wheels to turn so that the distributer will follow the direction in which it is drawn. An inverted arch bar 19 is secured to the other stationary member of turn-table 18 to sustain the front end of the box and its frame.

The receptacle 12 comprises sides 20 and inclined front-wall 21 extending between the sides. An endless apron 22 forms the bottom of the receptacle and is driven to cause the upper lap thereof, to move rearwardly and feed the fertilizer toward the back of the machine and to a beater 23. The sides 20 of the receptacle 12 are secured to the frame of the machine, which comprises side bars or sills, 24 which are bent upwardly at the rear ends to form upright end bars 25. Sides 20 are secured to sills 24 respectively, by the angle iron uprights or bars 26. The rear of the receptacle and its frame are sustained from the rear axle 13 by a pair of brackets which are secured to the sills 24 respectively, by the bolts 28ª, and have bearings 29 at their rear ends through which the rear axle 13 extends. These brackets 28 extend upwardly and rearwardly from the sills 24, to the rear axle, or forwardly and downwardly from the rear axle to said sills, so that the sills 24 and the bottom of the box will be disposed in front of the rear-axle and below the horizontal plane thereof.

The front of the receptacle is secured to the forwardly and upwardly extending portions or arms 30 of sills 24, which are secured to brackets 31, which are secured to a cross-bar 32 to which said brackets are secured by bolts 33, and which is bolted, as at 44, to the inverted arch 19. An angular bar 35, of angle iron is provided at each side and has one of its members secured to one of the brackts 31, as at 36, and has its other arm or member secured to one of the sills 24, as at 37. The front 21 and sides 20 of the receptacle are bolted to angular bar 35 as at 38, to make rigid the front and upper portion of the box or receptacle, more particularly against lateral stresses. An angle-iron cross-bar 39 is secured to bars 35 for a like purpose, and a brace 40 is secured to cross-bar 39 as at 41, and extends downwardly and forwardly from said bar and has its front end secured to the turn-table 18 as at 42. This supporting-frame constitutes and forms suspension-means for the box or receptacle, which is primarily sustained by the carrying-wheels at the front and rear respectively, and whereby the receptacle will be suspended between the said wheels so that the receptacle may be disposed in close proximity to the ground and so that the fertilizer may be readily thrown into the box and over the sides thereof, as well as into the rear portion of the box adjacent the beater. Furthermore, this construction efficiently and rigidly supports the box in such position or arrangement. Another characteristic of this supporting structure is, that it permits the beater to be disposed in front of the rear axle and overcomes the disadvantages of a beater concentric with the rear axle.

The beater 23 may be of any suitable construction, as well understood in the art and comprises fingers 45, and cross-bars secured to sides 46 which are secured to a shaft 47. Said shaft is mounted in bearings 48 which are secured to frame-ends 25, so that the beater remains in fixed relation to the receptacle. The beater is driven by a sprocket wheel 48ª which is loose on the rear axle, and is adapted to be driven from one of the carrying-wheels, through a clutch hereinafter described. A chain 49 connects said sprocket and a sprocket-wheel 50 on a stud 51, and a gear-wheel 52 rotating with sprocket 50, and meshing with a pinion 53 which is secured to the beater shaft 47, to drive the beater from sprocket 48ª.

A gate or retarder comprises fingers 55, which are connected to arms 54 so that they may be raised into and out of operative position, as well understood in the art, but since the particular construction of this retarder forms no part of the present invention it has not been deemed necessary to illustrate or describe it in detail.

The slats 61 of endless apron 22 which forms the bottom of the receptacle, are secured to chains 62 which pass around sprocket-wheels 56 which are secured on a cross-shaft 57 which is mounted in bearings 58 secured to brackets 28. At the front of the receptacle, chains 62 pass around sprocket-wheels 59 on a shaft 60 which is adjustably sustained so that the slack of the apron may be taken up, as well understood in the art. The endless apron is driven from the rear axle by a gear-wheel 63 which is fixed on said axle and which is provided with three annular series of gear-teeth for driving a pinion 64 at the different speeds and spaces between the series of which, when said pinion is shifted thereinto, render the apron inoperative. Said pinion is slidably mounted and connected to drive a shaft 65 which has a worm-pinion 66 thereon, which meshes with a worm-gear 67 on shaft 57. By means of this driving-mechanism, the endless apron will be driven to move the fertilizer in the receptacle backwardly and to feed it to the beater.

Pinion 64 is slidably mounted and connected to a rod 73 whereby the pinion may be shifted into or out of engagement with either of the series of teeth on gear 63 or into the spaces between the series of teeth. The front end of rod 73 is connected to a lever 72 which has its fulcrum connected to one of the arms 85 on cross shaft 71 to which a foot lever 70 is secured. 71 also carries a rack 72ª which has an arm or extension thereon through which rod 73 passes. When foot-lever 70 is operated, shaft 71 will be rocked to bodily shift lever 72, rack 72ª and rod 73 sufficient to shift pinion 64 into or out of engagement with one of the series of the teeth on wheel 63. By adjusting lever 72 about its fulcrum and locking it in different position with respect to rack 72ª, rod 73 may be adjusted to bring pinion 64 into operative relation with either of the series of teeth on gear wheel 63. Shaft 71 is journaled in brackets 74 which are secured to frame-arms 30. The particular construction of the gear-mechanism for controlling the operation of the beater and the mechanism for driving the apron is not claimed in this application.

The driving mechanism for the beater, may be rendered inoperative from the rear axle by a clutch which comprises members 48ᵇ and 76ᵃ one of which consists of clutch teeth on sprocket wheel 48ᵃ which is mounted on axle 13, and the other which consists of a series of teeth on a driving collar 76, which is secured to said axle. A sectionally-formed controlling collar 77 has an annular rib fitting in a groove in the hub of sprocket 48ᵃ for sliding the sprocket on axle 13 and has angular ribs 78 which fit between lugs 79 on one of the bearings 29 on a bracket 28, so that by rotation of said collar, sprocket 48ᵃ and clutch member 48ᵇ will be thrown into or out of operative relation with the other clutch-member 76ᵃ. This collar 77 is controlled by a rod 80 which extends through an arm 81 on said collar, and is provided with a nut 82 for shifting the arm in one direction, and has a spring 83 engaging the other side of said arm to yieldingly shift the collar in the opposite direction, so that the sprocket-wheel 48 will be yieldingly shifted into engagement with clutch-member 76 when the beater is to be operated. Rod 80 is pivoted as at 84 to one of the levers 54 which controls the retarder and resultantly an additional connection or rod for operating the clutch from one of the arms 85 on rock-shaft 71 is avoided. Each arm 54 is connected to an arm 85 on shaft 71 by a rod 86.

Gear-wheel 63 and clutch-member 76 which are secured to the rear-axle, are connected to the rear-carrying-wheels, respectively, by suitable ratchet or one-way driving connections, as well understood in the art. When the main lever 70 is in the position shown in drawings, the clutch which controls the beater-driving mechanism will be operative and the beater 23 will be driven, as the machine advances, from the wheels 13. The beater will discharge the fertilizer rearwardly of the box and over the axle 13. At the same time, the apron 22 will be gradually advanced to feed the fertilizer to the beater. When the lever 70 is raised the clutch for controlling the beater-driving-mechanism will be rendered inoperative by means of one of the arms 85, rod 86, lever 54, rod 80, arm 81 and collar 77. Simultaneously, the pinion 64 of the apron-driving-mechanism will be disengaged from the gear-teeth on wheel 63, to render said mechanism inoperative, by one of the arms 85, lever 72, and rod 73.

The invention thus exemplifies a "low-down" spreader in which all parts of the receptacle are easily accessible for loading, and in which the beater is disposed forwardly of the rear-axle.

The invention is not to be understood as restricted to the details set forth as these may be modified by the skilled mechanic within the scope of the appended claims without departing from the spirit and scope of the invention.

Having thus described the invention what I claim as new, and desire to secure by Letters Patent is:

1. In a fertilizer distributer, the combination of front and rear carrying-wheels, an axle for the rear wheels, a receptacle having its rear end disposed forwardly of said axle, and a rotary beater having its axis disposed forwardly of said axle, mounted to rotate about the fixed axis and disposed to discharge the material over said axle.

2. In a fertilizer distributer, the combination of the front and rear carrying-wheels, a rotary axle for the rear wheels, a receptacle having its rear end disposed forwardly of said axle, a conveyer disposed below said axle, and a rotary beater for discharging material rearwardly from the receptacle, and having its axis eccentrically disposed with respect to said axle.

3. In a fertilizer distributer, the combination of front and rear carrying-wheels, an axle for the rear wheels, a receptacle having its rear end disposed forwardly of said axle, a beater for discharging material rearwardly from the receptacle mounted to discharge material over said axle, and having its axis disposed forwardly of said axle, and mechanism for driving the beater from one of the rear wheels.

4. In a fertilizer distributer, the combination of front and rear carrying-wheels, an axle for the rear wheels, a receptacle having its rear end disposed forwardly of said axle, the conveyer forming the bottom of the receptacle, disposed below the axle, a rotary beater for discharging material from the receptacle, having its axis eccentrically disposed with respect to said axle, and mechanism for driving the beater from one of the rear wheels.

5. In a fertilizer distributer, the combination of front and rear carrying-wheels, an axle for the rear wheels, a receptacle disposed forwardly of the axle having a bottom below said axle, and a rotary beater disposed to discharge the material over said axle and having its axis disposed forwardly of said axle.

6. In a fertilizer distributer, the combination of front and rear carrying-wheels, an axle for the rear wheels, a receptacle disposed forwardly of the axle and having a bottom disposed below said axle, a rotary beater disposed to discharge the material over said axle and having its axis disposed forwardly of said axle, and mechanism for driving the beater from one of the rear carrying-wheels.

7. In a fertilizer distributer, the combination of front and rear carrying-wheels, an axle for the rear wheels, a receptacle disposed forwardly of the axle, having a bottom below said axle, a rotary beater disposed to discharge the material rearwardly and over, and, having its axis disposed forwardly of said axle, and mechanism for driving the beater from one of the rear carrying-wheels.

8. In a fertilizer distributer, the combination of front and rear carrying-wheels, an axle for the rear wheels, a receptacle having its rear end disposed forwardly of said axle, having a bottom disposed below said axle, a rotary beater disposed to discharge the material over said axle having its axis disposed forwardly of said axle, and mechanism for driving the beater from one of the rear carrying-wheels.

9. In a fertilizer-distributer, the combination of front and rear carrying-wheels, an axle for the rear wheels, a receptacle disposed forwardly of said axle, a rotary beater disposed at the rear of said receptacle, for discharging the material rearwardly from the receptacle and over the axle, and having its axis disposed forwardly of said axle, fixed journals for said beater, a movable bottom for the receptacle, means for operating said bottom to feed the material in the receptacle rearwardly to the beater, and carrying-wheel operated driving-mechanism for the beater.

10. In a fertilizer distributer, the combination of front and rear carrying-wheels, a rotating axle for the rear wheels, a receptacle disposed forwardly with respect to said axle, a rotary beater disposed at the rear end of said receptacle for discharging the material rearwardly from the receptacle, and having its axis eccentrically disposed with respect to said axle, fixed journals for said beater, a movable conveyer bottom for the receptacle disposed below said axle, means for operating said bottom to feed the material in the receptacle rearwardly to the beater, and carrying-wheel operated driving mechanism for the beater.

11. In a fertilizer distributer, the combination of front and rear carrying-wheels, an axle for the rear wheels, a receptacle having its rear end disposed forwardly of said axle, a rotary beater disposed at the rear end of said receptacle, for discharging the material rearwardly from the receptacle, and having its axis disposed forwardly of said axle, fixed journals for said beater, a movable bottom for the receptacle, disposed below the plane of the axle, means for operating said bottom to feed the material in the receptacle rerwardly to the beater, and carrying-wheel operated driving mechanism for the beater.

12. In a fertilizer distributer, the combination of front and rear carrying-wheels, an axle for the rear carrying-wheels, a receptacle disposed forwardly of the axle, an endless apron forming a movable bottom for the said receptacle and having its rear end disposed forwardly of, and below the plane of said axle, a rotary beater for discharging the material from the receptacle, having its axis disposed forwardly of said axle, and mechanism for driving the beater from one of the rear carrying-wheels.

13. In a fertilizer distributer, the combination of front and rear carrying-wheels, an axle for the rear carrying-wheels, a receptacle disposed forwardly of axle, an endless apron forming a movable bottom for the said receptacle, and having its rear end disposed forwardly of, and below the plane of said axle, a beater disposed to discharge the material rearwardly from the receptacle and over said axle and having its axis disposed forwardly of said axle, and mechanism for driving the beater from one of the rear carrying-wheels.

14. In a fertilizer distributer, the combination of front and rear carrying-wheels, an axle for the rear carrying-wheels, a receptacle disposed forwardly of axle an endless apron forming a movable bottom for said receptacle, and disposed below the plane of said axle, a rotary beater for discharging material from the receptacle, having its axis disposed forwardly of said axle, driving mechanism for the beater, and carrying-wheel operated mechanism for driving the apron to feed the material rearwardly to the beater.

15. In a fertilizer distributer, the combination of front and rear carrying-wheels, an axle for the rear carrying-wheels, a receptacle disposed forwardly of the axle, an endless apron forming a movable bottom for the said receptacle and disposed below the plane of said axle, a beater disposed to discharge the material rearwardly from the receptacle and over the axle, and having its axis disposed forwardly of said axle, mechanism for driving the beater and mechanism for driving the apron to feed the material rearwardly to the beater.

16. In a fertilizer distributer, the combination of front and rear carrying-wheels, an axle for the rear carrying-wheels, a receptacle disposed forwardly of the axle, supporting-brackets having bearings on said axle and extending diagonally forwardly and secured to the receptacle, and a beater for discharging the material from the receptacle having its axis eccentrically disposed with respect to the axle.

17. In a fertilizer distributer, the combination of front and rear carrying-wheels, an axle for the rear carrying-wheels, a receptacle disposed forwardly of the axle, a frame for the receptacle, supporting-brackets having bearings on the axle and extending diagonally forwardly to and secured to the frame, and a beater for discharging the material from the receptacle having its axis disposed forwardly of the axle.

18. In a fertilizer distributer, the combination of front and rear carrying-wheels, an axle for the rear carrying-wheels, a receptacle disposed forwardly of the axle, framework for the receptacle, supporting-brackets having bearings on the axle and extending forwardly and downwardly diagonally from the bearings and secured to the frame, and a beater for discharging the material from the receptacle disposed in front of the axle.

19. In a fertilizer distributer, the combination of front and rear carrying-wheels, an axle for the rear carrying-wheels, a receptacle disposed forwardly of the axle, a frame for the receptacle, supporting-brackets having bearings on the axle and extending forwardly and downwardly diagonally from the axle and secured to said frame, and a rotary beater having its axis disposed forwardly of the axle.

CALVIN R. DAVIS.

Witnesses:
E. H. SIEKMANN,
F. H. BASCHEN.